United States Patent [19]
Yu

[11] Patent Number: 6,105,568
[45] Date of Patent: Aug. 22, 2000

[54] DIAMOND WIRE SAW

[76] Inventor: Fang-Chun Yu, 18, Alley 123, Lane 668, Ying-Tao Road Ying Ko, Taipei, Taiwan

[21] Appl. No.: 09/219,157

[22] Filed: Dec. 22, 1998

[51] Int. Cl.[7] .............................. B28D 1/06; B28D 1/08; B28D 1/12
[52] U.S. Cl. ......................... 125/18; 125/16.02; 125/21; 125/22; 83/651.1
[58] Field of Search ............................ 83/651.1; 125/12, 125/16.01, 16.02, 21, 18, 22; 451/541, 542, 547

[56] References Cited

U.S. PATENT DOCUMENTS

| | | |
|---|---|---|
| 1,657,569 | 1/1999 | Fennell . |
| 2,679,839 | 6/1954 | Metzger . |
| 2,773,495 | 12/1956 | Lefevre . |
| 4,674,474 | 6/1987 | Baril ........................................... 125/21 |
| 4,856,490 | 8/1989 | Kawase et al. ........................... 125/21 |
| 5,377,659 | 1/1995 | Tank et al. ................................ 125/21 |

*Primary Examiner*—Timothy V. Eley
*Attorney, Agent, or Firm*—Rosenberg, Klein & Lee

[57] ABSTRACT

A diamond wire saw includes a steel cable, a plurality of rotary diamond abrasive barrels respectively mounted around the steel cable, and pairs of compression springs respectively mounted around the steel cable and fastened to each of the rotary diamond abrasive barrels at tow opposite ends by packing rings, the rotary diamond abrasive barrels each having a spiral convex portion and a spiral concave portion arranged in parallel around the periphery, and a diamond abrasive layer of substantially equal thickness covered on the spiral convex portion and the spiral concave portion, the diamond abrasive layer having a plurality of diamond cutting grains fastened thereto for cutting things.

3 Claims, 3 Drawing Sheets

DIAMOND WIRE SAW

BACKGROUND OF THE INVENTION

The present invention relates to a diamond wire saw used for cutting stones, glass, silicon, etc., and more particularly to such a diamond wire saw in which the diamond abrasive layer of each diamond abrasive barrel has two halves spirally arranged in parallel at different elevations, and the lower half of the diamond abrasive layer works when the higher half of the diamond abrasive layer starts to wear.

A regular diamond wire saw is generally comprised of a steel cable and a plurality of diamond abrasive barrels mounted around the steel cable and connected in series. The diamond abrasive barrels each have a diamond abrasive layer covered on the outside wall thereof for cutting (see FIG. 1). The diamond abrasive layer has diamond grains arranged on it. Because each diamond abrasive barrel has a smooth outside wall with a diamond abrasive layer of substantially uniform thickness covered thereon, it wears quickly at one side. Furthermore, the linear cutting operation of conventional diamond wire saws achieves low cutting efficiency.

SUMMARY OF THE INVENTION

The present invention has been accomplished to provide a diamond wire saw which eliminates the aforesaid drawbacks. It is one object of the present intention to provide a diamond wire saw which has a long service life. It is another object of the present invention to provide a diamond wire saw which achieves high cutting efficiency. According to one aspect of the present invention, the diamond wire saw comprises a steel cable, a plurality of rotary diamond abrasive barrels respectively mounted around the steel cable, and pairs of compression springs respectively mounted around the steel cable and fastened to each of the rotary diamond abrasive barrels at two opposite ends by packing rings, wherein the rotary diamond abrasive barrels each comprise a spiral convex portion and a spiral concave portion arranged in parallel around the periphery, and a diamond abrasive layer of substantially equal thickness covered on the spiral convex portion and the spiral concave portion, the diamond abrasive layer having a plurality of diamond cutting grains fastened thereto for cutting things. According to another aspect of the present invention, the rotary diamond abrasive barrels can be made of metal (for example middle carbon steel), and then covered with a diamond abrasive layer, According to still another aspect of the present invention, when the diamond abrasive layer at the spiral convex portion starts to wear, the diamond abrasive layer at the spiral concave portion starts to work, and therefore, the service life of the diamond wire saw is prolonged.

DETAILED DESCRIPTION OF THE PREFERRED EMBODIMENT

Figure 4:
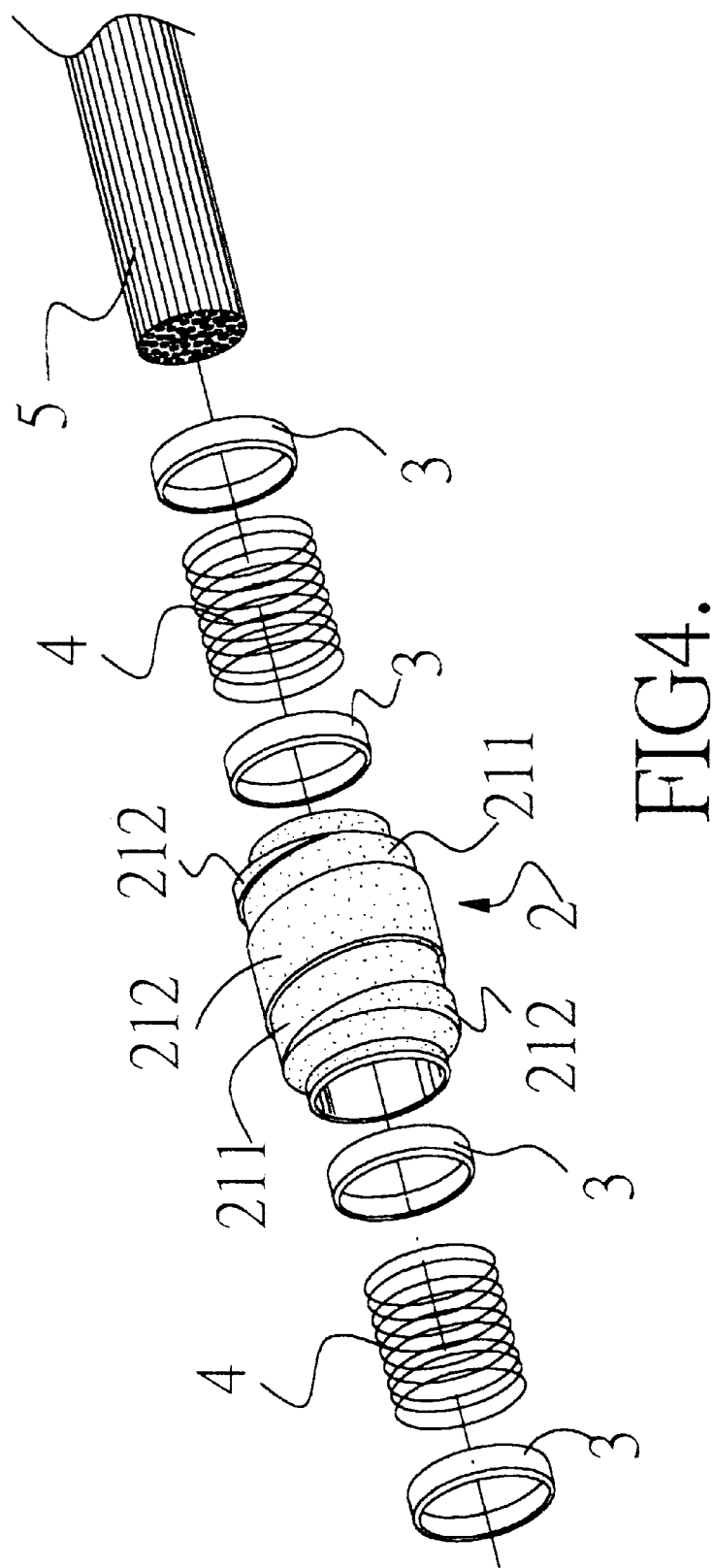
FIG. 4 is an exploded view of a diamond wire saw according to the present invention.

Referring to FIG. 4, a diamond wire saw in accordance with the present invention is generally comprises of a steel cable 5, a plurality of rotary diamond abrasive barrels 2 mounted around the steel cable 5 and connected in series, and pairs of compression springs 4 mounted around the steel cable 5 and fastened to each rotary diamond abrasive barrel 2 at two opposite ends by packing rings 3.

Figure 1:
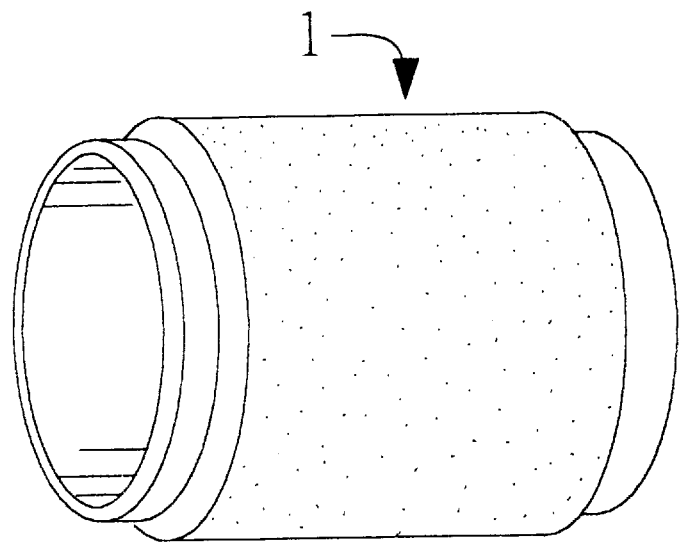
FIG. 1 is a perspective view of a diamond abrasive barrel according to the prior art.
Figure 2:
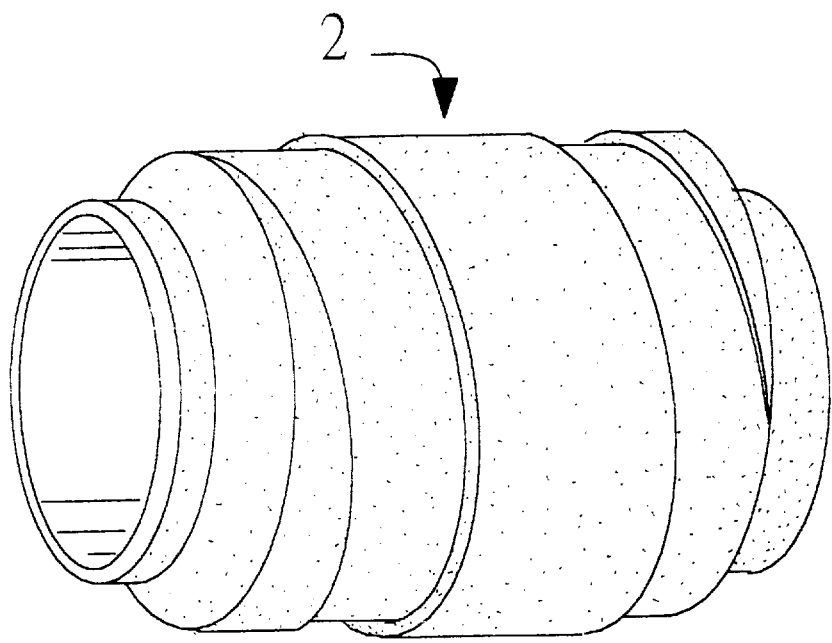
FIG. 2 is a perspective view of a diamond abrasive barrel according to the present invention.
Figure 3:
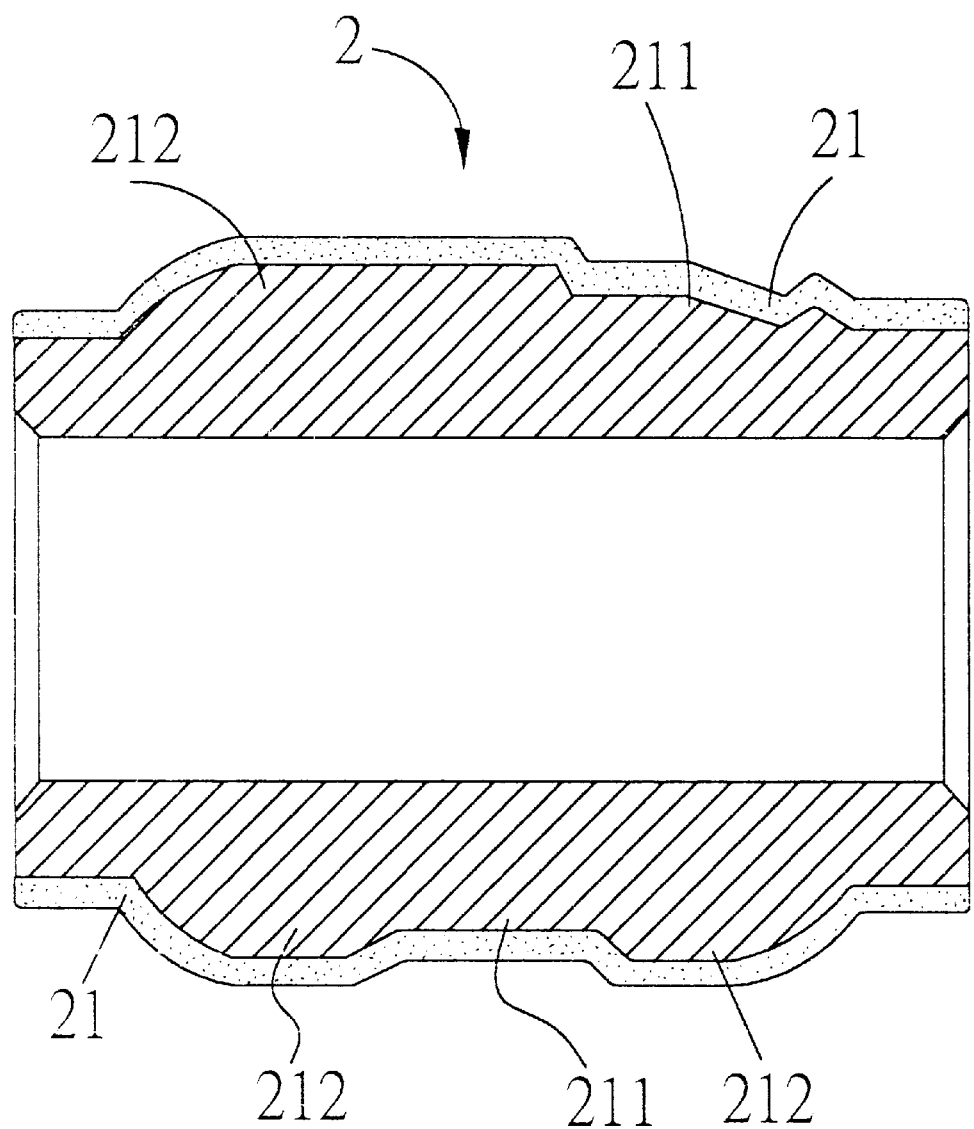
FIG. 3 is a sectional view in an enlarged scale of the diamond abrasive barrel shown in FIG. 2.

Referring to FIGS. 2 and 3 and FIG. 4 again, the rotary diamond abrasive barrel 2 comprises a spiral convex portion 212 and a spiral concave portion 211 arranged in parallel around the periphery, and a diamond abrasive layer 21 of substantially equal thickness covered on the spiral convex portion 212 and the spiral concave portion 211. The depth of the spiral concave portion 211 is about 40%~65% of the diameter of the diamond grains in the diamond abrasive layer 21. For example, the diameter of the diamond grains in the diamond abrasive layer 21 is about 0.45 mm, and the depth of the spiral concave portion 211 is about within 0.2 mm~0.25 mm. Therefore, when the diamond grains in the diamond abrasive layer 21 above the spiral convex portion 212 are going to wear out, the diamond grains in the diamond abrasive layer 21 above the spiral concave portion 211 are protruded for cutting.

What the invention claimed is:

1. A diamond wire saw comprising:
   (a) a rope member:
   (b) at least one rotary barrel member having a through opening, said rope member extending through said rotary barrel member, said rotary barrel member having a spiral convex portion and a spiral concave portion parallel each to the other around a periphery of said rotary barrel;
   (c) a pair of compression springs respectively mounted on opposing ends of said rotary barrel member, each of said compression springs being fastened to said rotary barrel member by a pair of packing rings positioned at opposing ends of each of said compression springs; and,
   (d) an abrasive layer having a substantially equal thickness covering said rotary barrel spiral convex and concave portions, said abrasive layer having a plurality of rigid cutting grains.

2. The diamond wire saw of claim 1 wherein said rigid cutting grains of said abrasive layer are diamond grains.

3. The diamond wire saw of claim 1 wherein said rope member is a steel cable formed of multiple steel wires.

* * * * *